United States Patent [19]
Frost et al.

[11] 3,926,485
[45] Dec. 16, 1975

[54] BEARING HOUSING ASSEMBLY

[75] Inventors: Charles C. Frost, Newaygo; Siegfried K. Weis, Grand Rapids, both of Mich.

[73] Assignee: C. L. Frost & Son, Inc., Grand Rapids, Mich.

[22] Filed: Aug. 19, 1974

[21] Appl. No.: 498,381

Related U.S. Application Data

[62] Division of Ser. No. 355,598, April 30, 1973, Pat. No. 3,844,010.

[52] U.S. Cl. .............................. 308/193; 308/189 R
[51] Int. Cl.[2] .......................................... F16C 33/00
[58] Field of Search ................ 308/189 R, 193, 233

[56] References Cited
UNITED STATES PATENTS

| | | | |
|---|---|---|---|
| 2,481,146 | 9/1949 | Palumbo | 308/193 |
| 2,673,768 | 3/1954 | Douglas | 308/233 |
| 2,759,243 | 8/1956 | Smith | 308/189 R |

*Primary Examiner*—Robert S. Ward, Jr.
*Assistant Examiner*—Richard A. Bertsch
*Attorney, Agent, or Firm*—Price, Heneveld, Huizenga & Cooper

[57] ABSTRACT

Molded plastic bearing housing formed as two individual sections adapted for placement over a bearing. The individual sections are each provided with mating, annular flange members which when telescoped together, are ultrasonically welded to form an integral one-piece bearing housing. In one of the embodiments illustrated, the individual sections may be provided with radially, outwardly extending flanges to cooperatively provide a pulley having a bearing integrally mounted therein.

4 Claims, 4 Drawing Figures

BEARING HOUSING ASSEMBLY

CROSS REFERENCE TO RELATED APPLICATION

This is a division of application Ser. No. 355,598, filed Apr. 30, 1973, entitled BEARING HOUSING ASSEMBLY AND METHOD, now U.S. Pat. No. 3,844,010 issued Oct. 29, 1974.

BACKGROUND OF THE INVENTION

Bearings utilized in pulleys, sheaves and like rotating mechanisms may be held in position about the center or rotational axis of the mechanism in various ways. One common method of holding a bearing or the like involves a press fit construction wherein the bearing is pressed into an opening provided in the center of the rotatable mechanism. When plastic materials are utilized in this construction, a considerable amount of material is required for strength and to prevent premature failure. In addition, separate seals and shields must be provided in the bearing to contain lubricants and to prevent the entrance of contaminating materials.

SUMMARY OF THE INVENTION

The present invention provides a bearing housing and retainer made of a thermoplastic material which is fused together utilizing ultrasonic welding techniques to encapsulate the bearing. The bearing and housing construction is suitable for use as an individual bearing and housing for placement within a pulley or the like or alternately, depending upon its outer configuration, the fused material may be formed as an integral housing and pulley.

Accordingly, it is an object of the present invention to provide a method of forming a bearing housing utilizing ultrasonic welding techniques.

It is another object of the present invention to provide a method of forming a pulley having an integral bearing and housing utilizing ultrasonic welding techniques.

These and other important objects and advantages of this invention will become readily apparent to those skilled in the art upon reading the following specification with reference to the accompanying drawings in which.

DESCRIPTION OF THE PREFERRED EMBODIMENT

Figure 1:
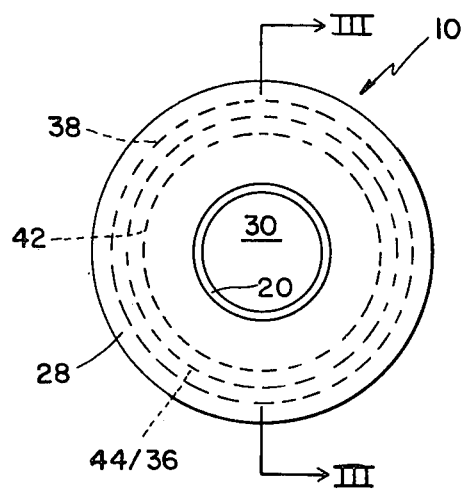
FIG. 1 is a side elevational view of a bearing housing constructed in accordance with the present invention.
Figure 2:
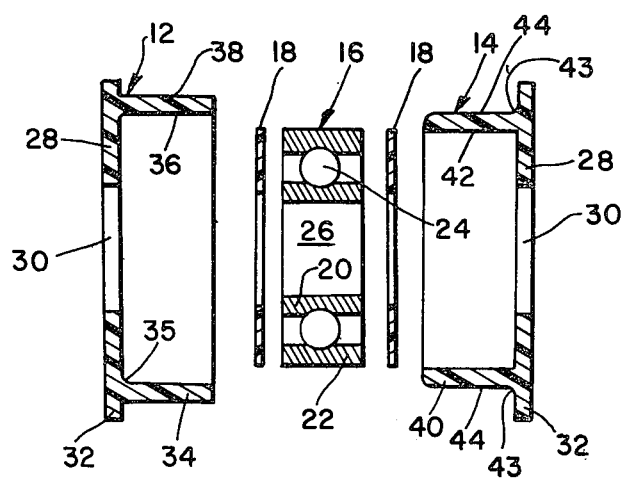
FIG. 2 is an exploded view of the housing and bearing shown in FIG. 1.

Referring now to the drawings, the bearing housing assembly 10 includes a pair of annular cup-shaped members 12 and 14, a bearing 16, and a pair of bearing seals 18. The bearing 16 may be of conventional construction having an inner race 20 and an outer race 22 separated by rolling elements 24. An opening 26 in the inner race is provided to accept a shaft (not shown) or the like upon which the bearing and housing is to rotate. The cup-shaped members 12 and 14 are preferably fabricated or molded of a thermo-plastic material preferably a synthetic fibre-forming polyamide commonly known as nylon.

Figure 3:
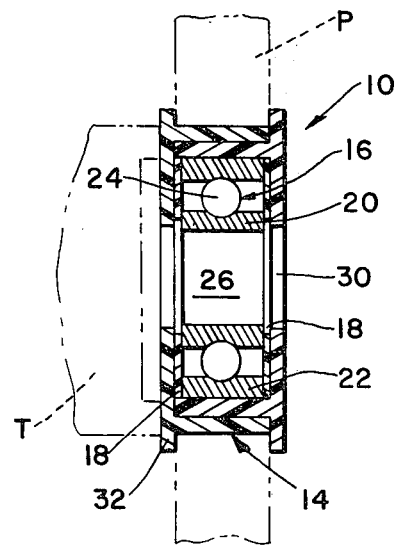
FIG. 3 is a cross-sectional view taken along the plane III—III of FIG. 1 illustrating the assembled bearing and housing.

The members 12 and 14 are essentially identical in shape, each including a flat circular bottom wall 28 having an opening 30 formed in the central portion. The opening 30 is slightly larger than the inner diameter 26 of the bearing 16 which is to be enclosed therein. The bottom walls 28 extend radially outwardly a distance from the opening 30 to form an outer peripheral flange or rim 32. A slight distance radially inwardly from the flange 32 an annularly extending side wall is formed. The annular side wall 34 on member 12 includes an inner wall surface 36 and an outer wall surface 38. The annular side wall 40 on member 14 extends outwardly a distance from the bottom wall 28 and also includes an inner wall surface 42, an outer wall surface 44. Outer wall surface 44 of member 14 is adapted to mate with the inner wall surface 36 of member 12 (FIG. 3). In a preferred embodiment, a radius 35 is provided at the intersection of side wall inner surface 36 and bottom wall 28. A similar radius 43 is provided on member 14 at the intersection of outer wall surface 44 and bottom wall 28. The side walls 34 and 40 are of such a length that when the members are pressed together as shown in FIG. 3, their outer extremities are closely adjacent bottom walls 28, i.e. positioned on the radii 35 and 43. The inner diameter of member 14 formed by the inner surfaces 42 of wall 40 corresponds to the diameter of the outer race 22 of bearing 16. The outer diameter of wall 40 defined by wall surface 44 is slightly less than the inner diameter of the wall 34 defined by the inner wall surface 36 of member 12.

To assemble the bearing housing, a first bearing seal 18 is positioned within the inner diameter of member 14 adjacent the end wall 28. The bearing 16 is then pressed into the inner diameter of member 14 and a second bearing seal 18 is positioned adjacent the bearing. Member 12 is then positioned over member 14 so that the wall surfaces 36 and 44 are in contact with each other as illustrated in FIG. 3 and the bearing is securely held there-between.

After the members 12 and 14 are assembled, they are fused together to form an integral housing about the housing. The fusing or welding of the members takes place between the inner wall surface 36 of member 12 and the outer wall surface 44 of member 14. This is accomplished through the utilization of a conventional ultrasonic welding apparatus. An ultrasonic tool or transducer T (shown in phantom in FIG. 3) is preferably annular in shape and is adapted for placement against a side wall 28 of one of the members 12 or 14 to encompass an area in alignment with the wall surfaces 36 and 44. As is known to those skilled in the art, the transducer connects electrical inputs from a generator into ultrasonic mechanical vibrations, i.e., 20,000 CPS or higher. As the transducer is pressed against the surface in alignment with the walls 34 and 40, the vibrations are transmitted from the transducer through the material to the interface between surfaces 36 and 44. The vibrations between the surfaces create frictional heat which is generated in the form of a complex of shear and compression waves to melt and fuse the adjacent surfaces.

Figure 4:
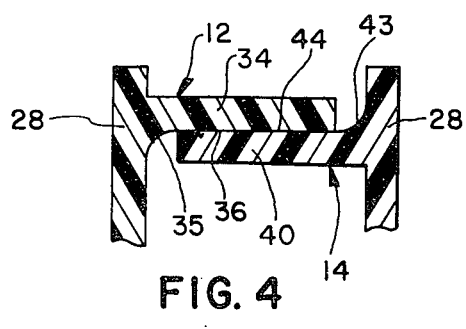
FIG. 4 is an enlarged cross-sectional view of portions of the assembly shown in FIGS. 2 and 3.

As illustrated in FIG. 4, the leading edges of wall surfaces 36 and 44 are in contact with the radii 35 and 43. As the ultrasonic vibrations occur, the members 12 and 14 are pressed together. The radii 35 and 43 melt because of the vibration between the leading edges and the radii and the melted radius material flows between the wall surfaces 36 and 44. As the radii 35 and 43 melt, the leading edges of the side walls move to the bottom wall 28 and become fused therewith. Simultaneously, the wall surfaces 36 and 44 fuse together. The members 12 and 14 form an integral unit to seal and hold the bearing in a nearly instantaneous operation as welding fusion takes place.

Depending on the configuration of the surfaces formed between the flanges 32 and the outer diameter of wall 34, the bearing and housing thus formed may be utilized as a pulley wheel. Alternatley, the housing may be assembled within the central opening of a larger diameter pulley or other rotating member P (illustrated in phantom in FIG. 3). When assembled in a larger diameter rotating mechanism, the member 12 is first placed in the opening of the wheel with the flange 32 resting against one of its sides. The remaining components, seals 18, bearing 16 and member 14 are then pressed into member 12 from the opposite side and the ultrasonic welding operation described above is performed. From the foregoing description and drawings, it will become readily apparent to those skilled in the art that the present invention provides a rapidly fabricated economical bearing housing. Lubricants contained in the bearing are completely sealed within the housing and the construction of the members 12 and 14 securely hold the bearing, the seal and forms a shield around the bearing thereby reducing bearing costs by eliminating the necessity of an integral bearing shield. The reduction in manufacturing costs is, of course, a significant aspect of this invention as the bearing housing is completely assembled in one simple operation. Material costs are also significantly reduced as the members 12 and 14 are easily and relatively inexpensively molded of thermo-plastic materials.

Other modifications, variations, and the many advantages of the present invention will be suggested to those skilled in the art without departing from the scope of the invention which is defined by the following claims.

The embodiments of the invention in which an exclusive property or privilege is claimed are defined as follows:

1. A bearing housing comprising: a pair of thermoplastic flange members each said member having a flat planar bottom wall portion and an annular outwardly extending side wall portion, said side wall portions having an inner wall surface and an outer wall surface, the inner wall surface on one of said members being slightly larger than the outer wall surface on the other of said members, the inner wall surface of said other of said members being adapted to receive the outer race of a bearing; said other of said members being telescopically received within said one of said members; said one of said members being fused to the other of said members to thereby form an integral housing about said bearing.

2. The bearing housing as defined in claim 1 wherein said bottom wall portions of each of said members extend radially outwardly from said side wall portions to cooperatively form a belt-receiving groove between said side walls.

3. The bearing housing of claim 1 wherein said inner diameter wall portion of said one of said members if fused to the outer diameter wall portion of the other of said members.

4. The bearing housing as defined in claim 3 and further including: said housing members each having a radious formed thereon at the intersection of said side wall portion and said bottom wall portion said one of said members being fused to the other of said members at the leading edge of said wall portion and said bottom wall at said radius.

* * * * *